United States Patent
Ramsey et al.

(10) Patent No.: US 12,278,467 B2
(45) Date of Patent: Apr. 15, 2025

(54) SCALABLE POWER TAP OFF SYSTEM

(71) Applicant: Schneider Electric USA, Inc., Andover, MA (US)

(72) Inventors: James Raymond Ramsey, Murfreesboro, TN (US); Timothy O'Leary, Antioch, TN (US); Clay Miller Cecil, Nashville, TN (US)

(73) Assignee: Schneider Electric USA, Inc., Boston, MA (US)

( * ) Notice: Subject to any disclaimer, the term of this patent is extended or adjusted under 35 U.S.C. 154(b) by 210 days.

(21) Appl. No.: 18/126,943

(22) Filed: Mar. 27, 2023

(65) Prior Publication Data
US 2023/0318267 A1    Oct. 5, 2023

Related U.S. Application Data

(60) Provisional application No. 63/324,466, filed on Mar. 28, 2022.

(51) Int. Cl.
*H02B 1/36* (2006.01)
*H02B 1/06* (2006.01)
(Continued)

(52) U.S. Cl.
CPC ............... *H02B 1/36* (2013.01); *H02B 1/06* (2013.01); *H02B 11/24* (2013.01); *H02B 13/025* (2013.01)

(58) Field of Classification Search
CPC ..... H02B 11/133; H02B 11/173; H02B 11/24; H02B 13/025; H01H 9/22
See application file for complete search history.

(56) References Cited

U.S. PATENT DOCUMENTS 4,090,230 A * 5/1978 Fuller .................... H02B 11/26
                                                       361/617
6,301,094 B1 * 10/2001 Soares ................... H02B 11/12
                                                       361/624
(Continued)

OTHER PUBLICATIONS

International Search Report and Written Opinion dated Jun. 23, 2023 for corresponding International Patent Application No. PCT/US 23/16445, 17 pages.

*Primary Examiner* — Robert J Hoffberg
(74) *Attorney, Agent, or Firm* — Troutman Pepper Locke LLP (57) ABSTRACT

A scalable power tap off system is provided for a power distribution system. The system can have components including a line-side connector assembly for connecting to an upstream power supply, a load-side connector assembly for connecting to downstream load(s), and a draw-out circuit breaker assembly connected between the line-side and load-side connector assemblies. The system also includes a shutter assembly having a movable shutter for proving a barrier to prevent access to at least line-side electrical components on the breaker assembly when the breaker assembly is in the racked-out state, and insulated interconnect buses for electrically connecting the line-side connector assembly and the load-side connector assembly to the breaker assembly. An enclosed compartment is provided to house the load-side connector assembly in isolation from other components and allows access to the load-side connector assembly when the breaker assembly is in a racked-out state or the load-side connector assembly is de-energized.

20 Claims, 7 Drawing Sheets

(51) Int. Cl.
*H02B 11/24* (2006.01)
*H02B 13/025* (2006.01)

(56) References Cited

U.S. PATENT DOCUMENTS

| | | | |
|---|---|---|---|
| 7,136,278 B2 * | 11/2006 | Allen | H01H 9/22 |
| | | | 361/647 |
| 7,348,510 B1 * | 3/2008 | Foley | H02B 1/305 |
| | | | 200/51 R |
| 9,576,751 B1 | 2/2017 | Handshoe | |
| 9,922,785 B2 * | 3/2018 | Jur | H01H 21/06 |
| 10,811,853 B2 * | 10/2020 | Rogers | E05B 65/06 |
| 2008/0012666 A1 | 1/2008 | Davison et al. | |
| 2016/0181749 A1 | 6/2016 | Rathjen et al. | |
| 2018/0083513 A1 | 3/2018 | Pharne | |
| 2020/0281090 A1 | 9/2020 | Huangfu et al. | |

* cited by examiner

Interlock Logic Table

| Circuit Breaker State | Tap-Off State | Interlock Action |
|---|---|---|
| Racked-In | Tap-Off is not installed | Tap-Off Installation is blocked |
| Racked-In | Tap-Off is installed | Tap-Off Removal is blocked |
| Racked-In | Any | Customer Connection Compartment Door is locked closed |
| Not Racked In | Any | Customer Connection Compartment Door is not locked |

SCALABLE POWER TAP OFF SYSTEM

RELATED APPLICATION

The present application claims priority to U.S. Provisional Patent Application Ser. No. 63/324,466, filed on Mar. 28, 2022 and entitled SCALABLE POWER TAP OFF SYSTEM, which is incorporated by reference herein in its entirety.

TECHNICAL FIELD

The present disclosure relates to a power distribution system, and more particularly, to a scalable power tap off system for a power distribution system.

BACKGROUND

Data centers and other facilities employ a power distribution system to supply power to equipment. When equipment in these facilities needs to be added, replaced or removed, the power supply may need to be turned off, including to other equipment, for a significant amount of time which can significantly impact adversely affect their operating efficiency. For example, in the context of a data center, power to existing servers may need to be turned off when adding server rack capacity.

SUMMARY

In accordance with an embodiment, a power tap off system is provided for a power distribution system. The power tap off system can comprise a plurality of components including:
- a line-side connector assembly for connecting to an upstream power supply;
- a load-side connector assembly for connecting to one or more downstream loads;
- a draw-out circuit breaker assembly connected between the line-side connector assembly and the load-side connector assembly, the breaker assembly including a breaker cradle for receiving a circuit breaker and a racking assembly for racking in or racking out the circuit breaker from the breaker cradle, the load-side connector assembly being disconnected from the line-side connector assembly when the circuit breaker is racked out or withdrawn from the breaker cradle;
- a shutter assembly including a movable shutter for proving a barrier to prevent access to at least line-side electrical components on the breaker cradle when the circuit breaker is racked out or withdrawn from the breaker cradle;
- insulated interconnect buses for electrically connecting the line-side connector assembly and the load-side connector assembly to the breaker cradle; and
- an enclosure including a plurality of enclosed compartments for housing the components, one of the enclosed compartments housing the load-side connector assembly in isolation from other components and allowing access to the load-side connector assembly when the breaker assembly is in a racked-out state or the load-side connector assembly is de-energized.

The breaker assembly can further comprise the draw-out circuit breaker.

In various embodiments, the line-side connector assembly can include connectors which are configured to connect to a power busway of the power distribution system. The line-side connector assembly can comprise a plurality of plug-in line connectors or bolt-on line connectors.

In one embodiment, the shutter assembly can be operatively connected to the racking assembly and can be configured to move to an open state when the circuit breaker is racked out or withdrawn, the shutter of the shutter assembly being positioned in the open state to create a barrier around line-side terminals or components on the breaker cradle in order to prevent user access thereto. The shutter assembly can further include: a shutter arm which is connected to move the shutter between the open state and a closed state, and a shutter linkage which is connected between the shutter arm and the racking assembly. The shutter linkage can cause the shutter arm to move the shutter to the open state when the racking assembly is operated to a racked-out state and cause the shutter arm to move the shutter to a closed state when the racking assembly is operated to a racked-in state.

In a further embodiment, the line-side connector assembly and the load-side connector assembly each can include a connector for each phase of a multi-phase power supply of the power distribution system. The power tap off system can further comprise interphase barriers in the enclosure between each phase. The line connector assembly and the load connector assembly each can further include a connector for neutral and/or a connector for ground.

In a further embodiment, the one of the enclosed compartments can include a first door through which to access the load-side connector assembly. The first door can include a lock mechanism which is configured to lock the door when voltage is detected by a voltage sensor on the load-side connector assembly or the insulated interconnect buses on a load-side or when the breaker assembly is in the racked-in state.

In another embodiment, the power tap off system can further comprise a voltage sensor for detecting voltage on the load-side connector assembly or the insulated interconnect buses on a load-side; and a voltage indicator for indicating a presence or absence of voltage on the load-side connector assembly or the insulated interconnect buses on a load-side, according to the detection.

In one embodiment, another of the enclosed compartments can house the breaker assembly, the shutter assembly and the insulated interconnect buses on a line-side, and includes a second door through which to access the breaker assembly for installing the draw-out circuit breaker or removing the draw-out circuit breaker when the breaker assembly is in the racked-out state. Furthermore, the second door can include a lock mechanism which is configured to lock the second door when the draw-out circuit breaker is racked-in to the breaker cradle or voltage is detected by a voltage sensor on the load-side connector assembly.

In another embodiment, a motor operator can be configured to control racking operation of the racking assembly and/or the shutter assembly.

In another embodiment, the one of the enclosed compartment can be designed to be arc resistant. Furthermore, another of the enclosed compartments can be configured to house line side-components of the components, and can be designed to be arc resistant.

BRIEF DESCRIPTION OF THE DRAWINGS

A more detailed description of the disclosure, briefly summarized above, may be had by reference to various embodiments, some of which are illustrated in the appended drawings. While the appended drawings illustrate select embodiments of this disclosure, these drawings are not to be considered limiting of its scope, for the disclosure may admit to other equally effective embodiments.

Identical reference numerals have been used, where possible, to designate identical elements that are common to the figures. However, elements disclosed in one embodiment may be beneficially utilized on other embodiments without specific recitation.

DETAILED DESCRIPTION

The present disclosure is directed to a scalable power tap off system (or SPTOS) for a power distribution system. The SPTOS is a power tap off unit or device, which can be connected to a power bus to supply power to a branch circuit and provide protection at the branch origin. In accordance with various embodiments, the SPTOS can incorporate various protective features (e.g., safety features), such as a draw-out circuit breaker assembly (also referred to as "breaker assembly"), shutter assembly, insulated bus interconnect system, isolated and enclosed compartment(s) for load-side components such as a load-side connector assembly and other components, and other protective features therein. The protective features can provide for electrical safety to enable a technician, electrician, service or maintenance personnel, or other user (generally referred to as "user") to safely access de-energized load-side components of the system, such as for example when the draw-out circuit breaker assembly is in the racked-out state (e.g., the draw-out circuit breaker is racked-out or withdrawn/removed from a breaker cradle in the system). The use of a draw-out circuit breaker assembly, such as in the racked-out state, can enable electrical isolation of the line-side connections between the upstream power supply (e.g., busway) and the breaker cradle from the load-side connections in order to mitigate electrical shock hazard (e.g., to mitigate potential arcing failures and mitigate electrical shock hazards).

Furthermore, when the breaker assembly is in the racked-out state, the shutter assembly, which can include a movable shutter and a shutter actuator (e.g., shutter arm(s) and link(s)), can be configured to have the shutter move in coordination with the breaker assembly to an open state to provide a barrier to the line-side components. For example, the shutter assembly could be configured to provide a barrier to line-side components from the breaker cradle to an upstream power bus (e.g., busway, etc.)) to further mitigate electrical shock hazards. The shutter of the shutter assembly can move to an open state when racking in the circuit breaker into the breaker cradle.

The load-side components of the SPTOS can include a load-side connector assembly (e.g., connectors and/or connections such as cable connectors, lug connectors or other connector types) for connecting to downstream customer equipment. The load-side components can be housed in an isolated, insulated and enclosed compartment in the enclosure of the system separately from other components of the system. In various embodiments, the load-side connector assembly can include a connector for each power phase (e.g., phase A, B, C in a three-phase power supply system), and, if desired, a connector for neutral (N) and/or a connector for ground (G).

Accordingly, in operation, when the breaker assembly is in the racked-out state, the SPTOS can allow a user to safely access de-energized (or non-energized) load-side components without having to turn OFF the power supply from a power bus which is upstream of the SPTOS. For example, a user can work on the de-energized load-side components of the SPTOS, which can be housed in their own isolated, insulated and enclosed compartment, for example, to add, remove or change downstream loads (e.g., data server racks, etc.) or other equipment related thereto without having to turn off the upstream power supply.

In various embodiments, the SPTOS can incorporate warning indicators, such as (without limitation) a voltage indicator(s), which can inform a user whether load-side, line side and/or other particular components of the system are energized/live (or not). The voltage indicator can be an LED(s) indicator, display or other user interface for informing a user of the presence or absence of voltage on the system or components thereof. The indication of the presence of voltage provides a warning to a user of a potential electrical hazard. The SPTOS can include one or more voltage testers or sensors (hereinafter referred to as voltage sensor") to detect voltage on the load-side components, line-side components and/or other components of the system. Accordingly, a user can verify an absence of voltage before opening the enclosed compartment with load-side components, such as the load-side connector assembly.

The SPTOS also can include a remote control system for remotely controlling the breaker assembly or its racking assembly, via a motor operator (also referred to as "motorized operator"), to rack-in the circuit breaker to the breaker cradle or to rack-out the circuit breaker from the breaker cradle. The remote control system can include a communication interface (e.g., transceiver) for conducting wireline or wireless communication with a remote device, and a controller (e.g., processor(s), CPU, controller, etc.) for controlling the operations of components of the SPTOS including the motor operator or other components and operations described herein. The motor operator can include a motor (e.g., a gear motor) and transmission system. In operation, the controller can control the racking operation according to command signals received via the communication interface from a remote device. By enabling a user to remotely rack-in or rack-out the draw-out circuit breaker, the SPTOS also provides a form of arc safety (e.g., arc flash risk mitigation) because the user can remotely operate the racking operations from a safe distance away from the SPTOS, such as outside the arc flash boundary when the circuit breaker is racked-in to the stabs/terminals on the breaker cradle. Alternatively, other operating mechanisms (e.g., a hook stick, mechanical linkage, handle, speed wrench, etc.) also can be employed to manually operate the racking operation of the SPTOS from a safe distance (e.g., 10 feet away or other suitable distance according to the arc flash boundary).

In an embodiment, the SPTOS can include an enclosure (or housing) having at least two isolated, insulated and enclosed compartments (e.g., sub-enclosures, chambers, etc.) that can share a common wall. The first enclosed compartment can provide an electrical power entry with insulated connections system (e.g., insulated interconnect buses (or conductors)), draw-out breaker assembly (e.g., draw-out circuit breaker, breaker cradle and racking assembly (also referred to as "draw out breaker mechanism")), a motorized operator or other operating mechanism to control the racking assembly to rack-in or rack-out the circuit breaker from the breaker cradle, a line-side shutter assembly (e.g., shutter and shutter actuating assembly), and circuit breaker operator mechanism (e.g., circuit breaker switch/handle) or combination thereof. The second enclosed compartment can include the load-side connector assembly, such as for example, customer connectors/connections for each phase (e.g., Phase A, B, and C), and if desired, also Ground (G) and/or Neutral (N). The second compartment also can include an interphase barrier system to isolate the components of each phase from the other phases, and can provide tool safe barriers between the two enclosed compartments. The second compartment also can include an access (e.g., a door) to enable user access, such as for example when the load-side components are de-energized (or non-energized). The second compartment can mitigate opportunities to access energized parts (e.g., mitigate electrical shock hazard). In an embodiment, the compartments of the SPTOS enclosure also can be designed to be arc resistant (Arc Resistant to comply with ANSI/IEEE C37.20.7 arc-resistant test guide). For example, the Arc Resistant feature can be included for line-side enclosure or enclosed compartment.

In an embodiment, the upstream power bus, which supplies power to the SPTOS, can be a busway system. The busway system can incorporate an enhanced insulation system at the connection region between a busway and the line-side connector assembly. In various embodiments, the line-side connector assembly can include a plurality of plug-in connectors (e.g., jaw connectors or the like), and the busway can include a plurality of plug-in openings or outlets (PIOs) to receive corresponding plug-in connectors from the SPTOS. The enhanced insulation system of the busway can include gaskets, seals and/or sealants between the PIO base and bus bars of the busway to prevent conductive gases from entering the busway and its bus stack.

Examples of these and other features of the SPTOS and other components related thereto of the present disclosure are described below with reference to the example figures.

Figure 1:
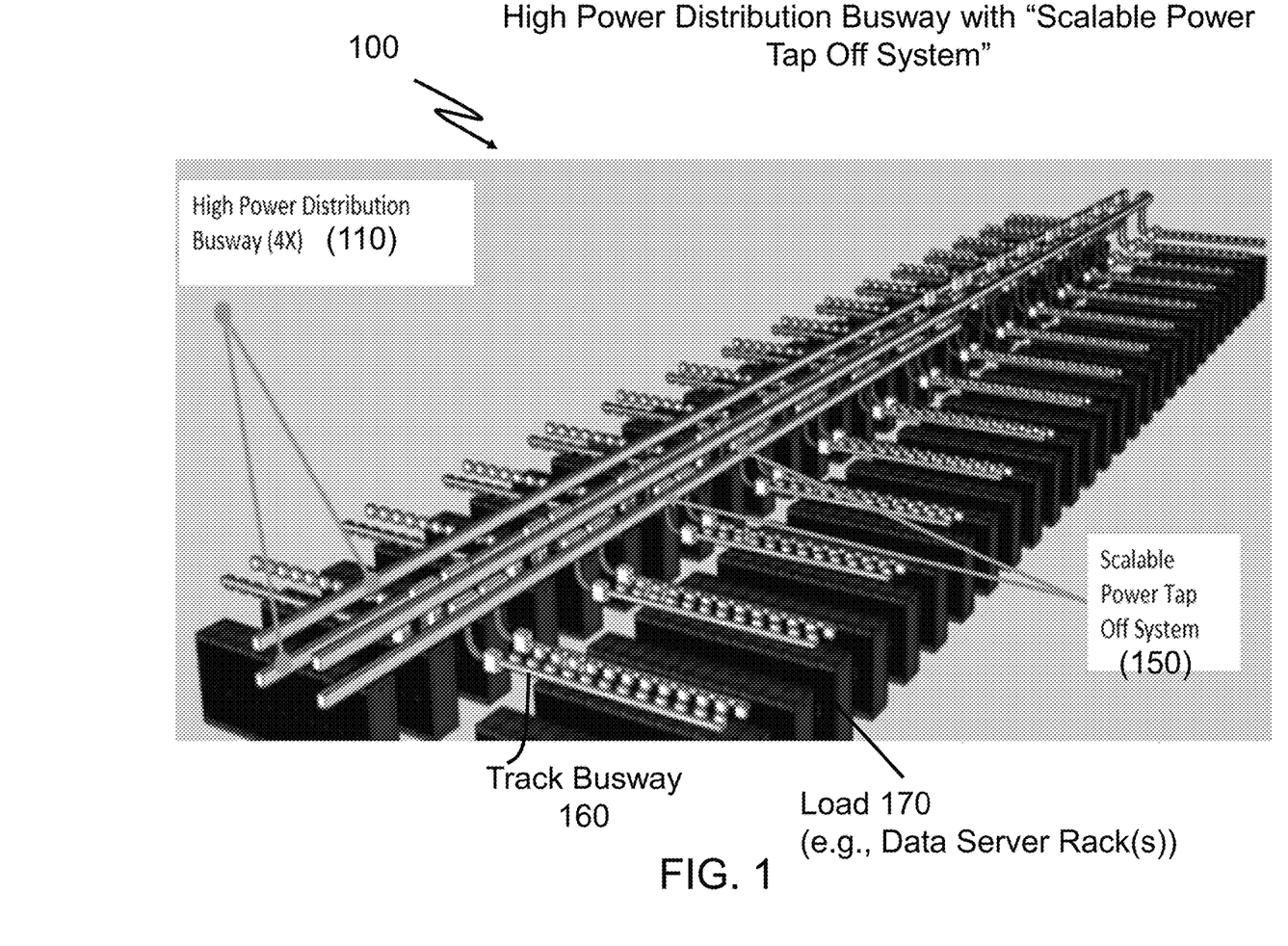
FIG. 1 is an overview of a power distribution system incorporating at least one scalable power tap off system (or SPTOS) in accordance with an embodiment described herein.

FIG. 1 is an example of a power distribution system 100, which includes a plurality of high-powered busways 110, a plurality of scalable power tap off systems (or SPTOSs) 150, and a plurality of track busways 160. Each track busway 160 can be connected to one of the high-powered busways 110 across a corresponding SPTOS 150. For example, each SPTOS 150 can be connected to a corresponding track busway 160, via conductors such as electrical cable(s). Each track busway 160 can supply power from the busways 110 to one or more loads 170. In this example, the power distribution system 100 is a power distribution system for a data center, and the one or more loads 170 can be data server racks. The busway(s) 110 can be installed on a ceiling of the data center, and can be an I-line busway manufactured by Schneider Electric. The power supplied by the power distribution system 100 can be a multi-phase power supply (e.g., a 3-phase power supply such as Phases A, B and C (including Ground and/or Neutral) or a supply with any number of phases. In an embodiment, the busway 110 can be a 2000 to 5000 amp busway.

The SPTOS 150 can be an enclosed power tap off unit or device, which can be connected to one of the busways 110 to supply power from the busway 110 to a branch circuit, in this example, a corresponding track busway 160. The track busway 160 can supply power to a plurality of loads, e.g., data server racks, connected or connectable thereto. The SPTOS 150 can include a line-side connector assembly for connecting to the busway 110, and a load-side connector assembly for connecting to the track busway 160. The SPTOS 150 also can include a circuit protective device such as a circuit breaker, which can be connected between the line-side and load side connector assemblies, to protect against a fault condition, overload condition, or other unwanted electrical condition on the branch circuit. In operation, the circuit breaker is configured to trip and interrupt the flow of power between the line-side and load side connector assemblies when an unwanted electrical condition is detected.

In accordance with various embodiments, the SPTOS 150 can include protective (or safety) features for electrical safety and arc safety, which enable a user to safely access load-side components, such as the load-side connector assembly (e.g., cable or other types of connectors for connecting to downstream equipment), when they are de-energized, without the need to turn OFF the upstream power supply such as on the busway 110. These protective features in the SPTOS can include:
  a draw-out circuit breaker assembly which can rack-in or rack-out (or enable withdrawal of) a draw-out circuit breaker from a breaker cradle;
  a shutter assembly which can form a protective barrier to prevent access to potential energized line-side components (e.g., including line-side interconnect buses and line-side terminals/stabs on the breaker cradle), when the circuit breaker assembly is in the racked-out state;
  a motorized operator (including a motor and transmission system) to enable remote control of the racking operation of the draw-out circuit breaker assembly and the operation of the shutter assembly, and/or an operating mechanism (e.g., a hook stick, mechanical linkage, handle, speed wrench, etc.) to enable manual operation of the racking operation of the draw-out circuit breaker assembly and the operation of the shutter assembly;
  insulated interconnect buses (or bus system) which can connect the line-side connector assembly and the load-side connector assembly to the breaker assembly, such as the breaker cradle and its terminals/stabs, as well as other electrical elements in the system.
  voltage sensor(s) to detect or identify the presence or absence of voltage on load-side components, line-side components and/or other components of the system, and voltage indicator(s) to indicate or output the presence or absence of voltage on the load-side components, line-side components and/or other components of the system; and Enclosure with a plurality of isolated, insulated and enclosed compartments (e.g., sub-enclosures, chambers, etc.) to house and isolate components of the system, such as a first compartment for at least circuit breaker assembly and the shutter assembly, and a second compartment for only load-side components or only the load-side connector assembly (e.g., load-side connectors, such as cable connectors or lug connectors, for connecting to downstream equipment) which can be accessed via a door when the load-side components are de-energized.

Figure 2:
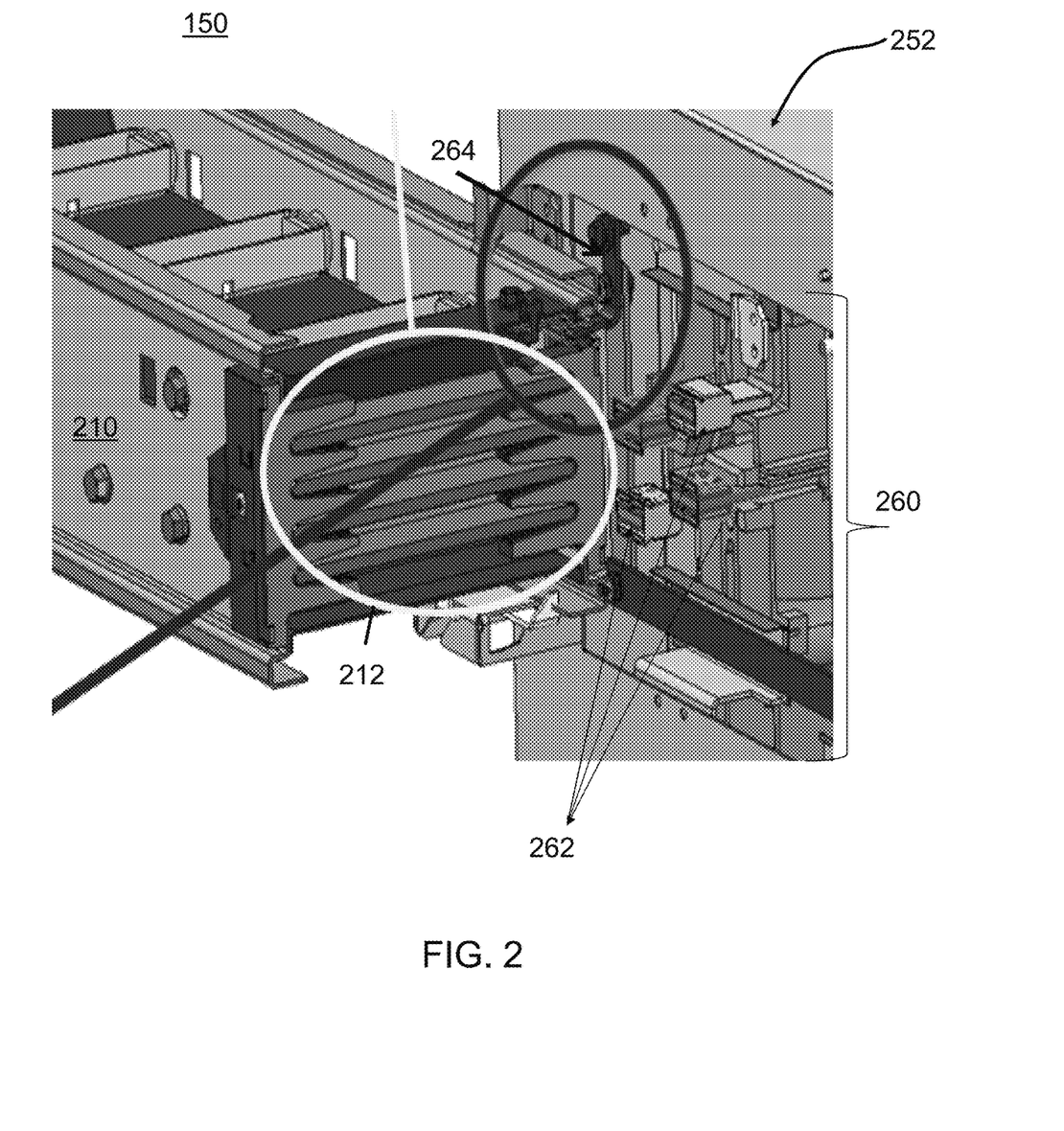
FIG. 2 is a partial view of a line-side connector assembly of a scalable power tap off system and a connector assembly of an upstream power bus, in this case a busway, in accordance with an embodiment described herein.

FIG. 2 is a partial view of a line-side connector assembly of a SPTOS and a connector assembly of a power bus, in this case a busway 210, in accordance with an embodiment. The busway 210 can incorporate an enhanced insulation system at the connection region between a busway and the line-side connector assembly 260 of the SPTOS 150. In this example, the SPTOS 150 can be a plug-in unit (e.g., a breaker plug-in unit for a busway). The line-side connector assembly 260 of SPTOS 150 can include a plurality of plug-in connectors 262, and the busway 210 can include a plurality of plug-in openings or outlets (PIOs) to receive corresponding plug-in connectors from the SPTOS. The plug-in connectors 262 can include a connector for each phase of the power supplied by the busway 210, and if desired, a connector for neutral (N) and/or ground (GND).

As further shown in FIG. 2, in this example, the SPTOS 150 is a plug-in unit which can be positioned along the busway length by notches in the busway housing top that accept a mounting hook(s) 264 of the plug-in unit. This aligns the plug-in unit connectors with the plug-in opening(s). After the unit is positioned on the busway 210, it can swing down into the plug-in opening so that the connectors make contact with the bus bars in the busway 210. This operation can be accomplished in a hook-swing sequence of motions. The mounting hook is one non-limiting example of a mounting system for mounting the SPTOS 150 to the busway 210. Other mounting systems may be used to the mount the SPTOS 150 to the busway 210.

The enhanced insulation system of the busway 210 can include gaskets, seals and/or sealants between the PIO base and bus bars of the busway 210 to prevent conductive gases from entering the busway in the region identified by reference 212 (e.g., the internal bus stack of the busway), which in turn can prevent a potential arcing path (e.g., Phase to Phase path, Phase to Neutral path, and Phase to Ground path). The gaskets, seals and/or sealants can be made of a dielectric material or other insulating and sealing material. Advantageously, the embodiment depicted in FIG. 2 provides an enhanced insulation system with gaskets, seals and/or sealants between the PIO base and the bus bars to prevent conductive gases from entering the busway.

Figure 3:
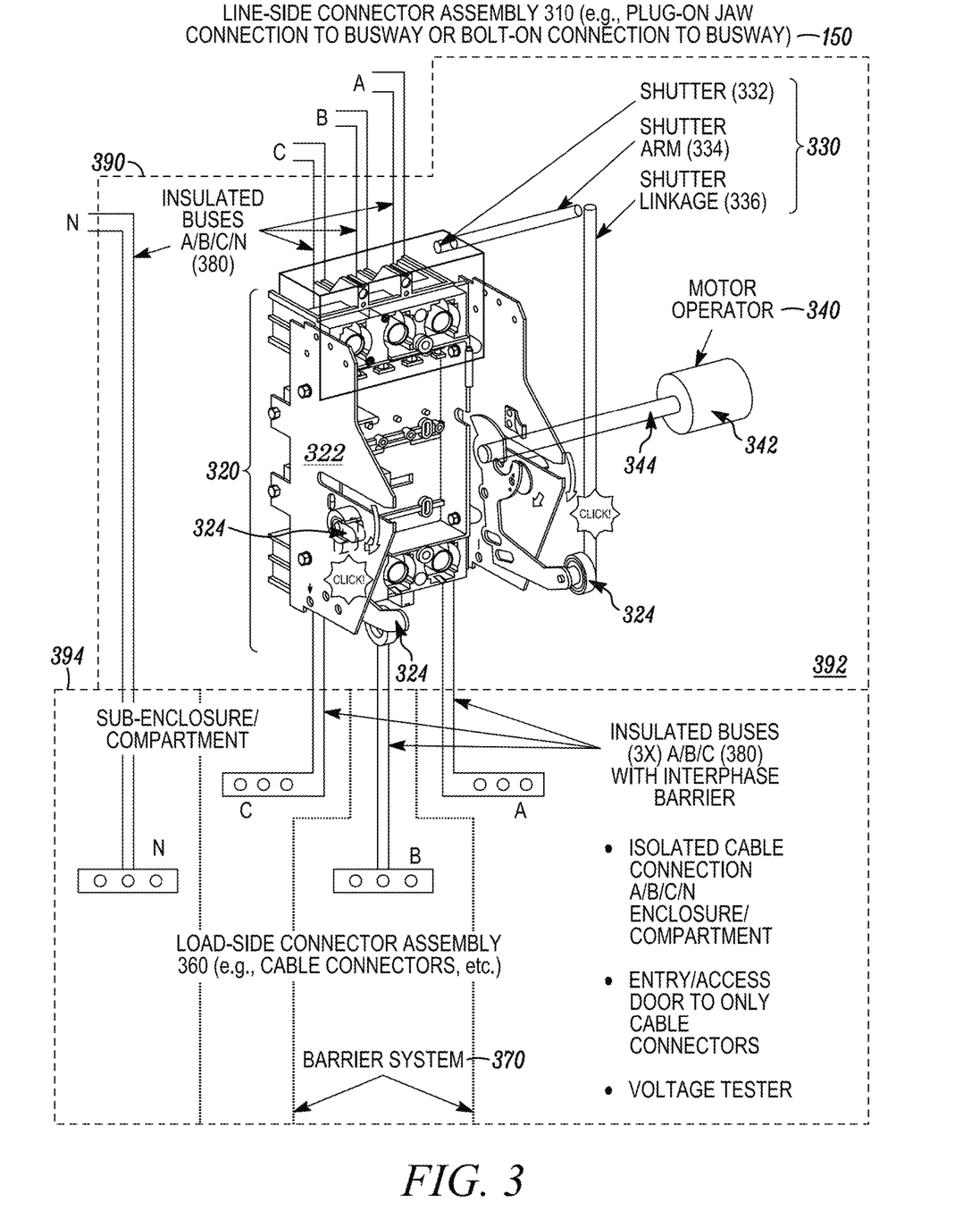
FIG. 3 shows example components and configuration of a scalable power tap off system with a draw-out circuit breaker assembly shown in a racked-out state without a draw-out circuit breaker, in accordance with an embodiment described herein t.
Figure 4:
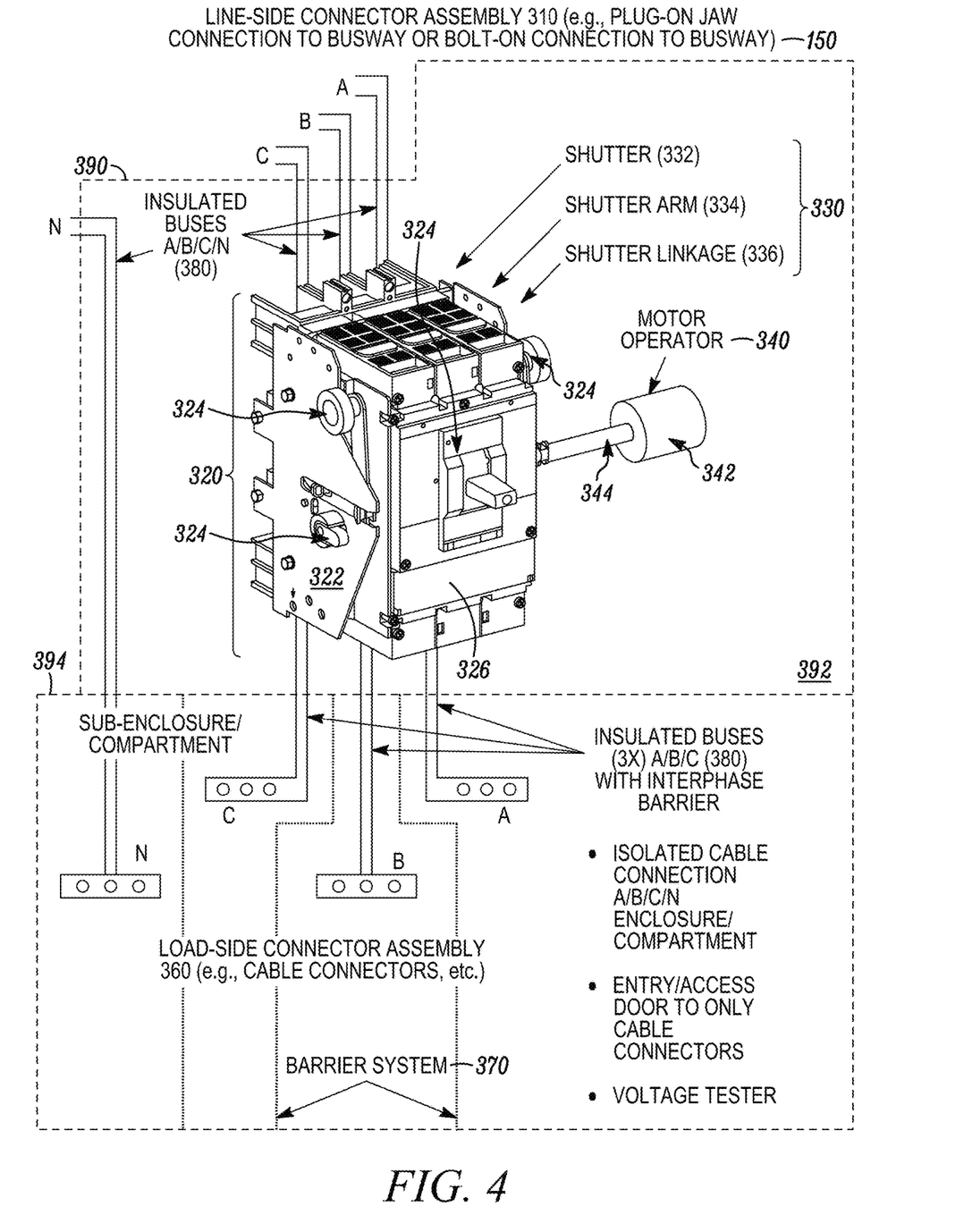
FIG. 4 shows example components and configuration of a scalable power tap off system with a draw-out circuit breaker assembly in which the draw-out circuit breaker is engaged to the breaker cradle in a racked-in state, in accordance with an embodiment described herein.

FIGS. 3 and 4 show example components and configuration of a scalable power tap off system (SPTOS) 150, in accordance with an embodiment. In this example, the SPTOS 150 can include a line-side connector assembly 310 for connecting to an upstream power bus (e.g., a busway, etc.) and load-side connector assembly 360 for connecting to downstream equipment via cable(s) or other conductors which are insulated. The line-side and load-side connector assembly 310, 360 each can include a connector for each phase (e.g., Phase A, B and C for a 3-phase power supply), as well as, if desired, a connector for neutral (N) (alternate embodiment could be a CB with A/B/C/N to eliminate neutral current electrical hazards) and a connector for ground (GND). In various embodiments, the line-side connector assembly 310 can include a plurality of connectors, such as plug-in connectors (e.g., jaw connectors, etc.) or bolt-on connectors or other types of electrical connectors depending on the application requirements. The load-side connector assembly 360 can include a plurality of connectors, such as cable connectors, lug connectors or other types of electrical connectors depending on the application requirements.

The SPTOS 150 also can include a draw-out circuit breaker assembly 320, which can include a breaker cradle 322, racking assembly 324 and draw-out circuit breaker 326. FIG. 3 shows the breaker cradle 322 without the circuit breaker 326 and with the racking assembly 324 in a racked-out state, and FIG. 4 shows the circuit breaker 326 engaged with the breaker cradle 322 in a racked-in state and a switch/lever 328 for operating the circuit breaker (e.g., turning ON the circuit breaker 326 to allow flow of power from the line-side to the load-side, or turning OFF the circuit breaker 326 to interrupt power flow from the line-side to the load-side, or resetting the circuit breaker 326, etc.). The breaker cradle 322 includes line and load terminals/stabs for each phase, which are configured to connect to or engage with corresponding line and load terminals on the circuit breaker 326, when the circuit breaker 326 is racked-in to the breaker cradle 322.

The SPTOS 150 can employ an insulated interconnect bus system 380 to connect the connectors of the line-side connector assembly 310 and the connectors of the load-side connector assembly 360 to the breaker cradle 22 (e.g., to corresponding line or load terminals/stabs on the breaker cradle 322 for each phase). For example, the bus system 380 can employ interconnect buses (or conductors), which are insulated, to mitigate potential arcing failure and mitigate electrical shock hazard. The interconnect buses between the line-side connector assembly 310 and the breaker assembly 320 can be referred to as "line-side" interconnect buses, and the interconnect buses between the load-side connector assembly 360 and the breaker assembly 320 can be referred to as "load-side" interconnect buses.

In the racked-in state, the line and load terminals/stabs of the breaker cradle 322 are connected to corresponding line and load terminals on the circuit breaker 326, thereby electrically connecting the load-side connector assembly 360 to the line-side connector assembly 310, across the insulated bus system 380. In the racked-out state, the load-side components including the load-side connector assembly 360 is disconnected from the line-side components including the line-side connector assembly 310. For further safety, a voltage sensor(s) can be used to detect for the presence (or absence) of voltage on the load-side components, and a voltage indicator(s) can be provided to output to the user an indication of the presence (or absence) of voltage on the load-side components according to the voltage detection performed by the voltage sensor(s). For example, the voltage sensor(s) can be configured to detect for the presence or absence of voltage on connectors of the load-side connector assembly 360 or on the load-side interconnect buses. The voltage indicator can be an LED(s) indicator, display, or other indicator). In various embodiments, the voltage status (e.g., presence or absence of voltage) can also be transmitted to a user device or accessed remotely by a user via the user device (e.g., a smartphone, computer tablet, laptop, etc.).

In various embodiments, the racking operation can be remotely controlled by a motor operator 340, which is operatively connected to the arm(s) or other portion of the racking assembly 324, or manually controlled by an operating mechanism (e.g., a hook stick, mechanical linkage, handle, speed wrench, etc.) operatively connected to the arm(s) or other portion of the racking assembly 324. The motor operator 340 can include a motor 342 (e.g., a gear motor or other suitable motor(s)) and a transmission system 344 (e.g., a mechanical link(s) which can include shaft(s), arm(s), gear(s), etc.) which is operatively connected to the racking assembly 324. The motor operator 340 can be controlled by a controller to rack-in or rack-out the circuit breaker 326, via the racking assembly 324, according to remote command received from a user device (or other remote system such as a remote control panel or a remote computerized monitoring or control system of a facility).

As further shown in FIGS. 3 and 4, the SPTOS 150 also can include a shutter assembly 330 for providing a barrier (e.g., a cover) to prevent access to line-side components, including line-side components on the breaker cradle 322 (e.g., line terminals/stabs), when the racking assembly 324 is in the racked-out state or the circuit breaker is withdrawn from the breaker cradle 322. The shutter assembly 330 can include a movable shutter 332, a shutter arm 334 which is connected to move the shutter 332 between an open state and a closed state, and a shutter linkage 336 which is connected between the shutter arm 334 and the racking assembly 324. The shutter linkage 336 is configured to cause the shutter arm 334 to move the shutter 332 to the open state when the racking assembly is operated to a racked-out state and cause the shutter arm 334 to move the shutter 332 to the closed state when the racking assembly 324 is operated to the racked-in state. In the open state, the shutter 332 can form a barrier to prevent access to the line-side components, which may be energized when the SPTOS 150 is connected to an upstream power supply bus (e.g., busway, etc.). The shutter 332 can be formed of a dielectric material or other insulating material.

Furthermore, the SPTOS 150 can have its enclosure (or housing) designed to incorporate an additional protective feature to further mitigate opportunities to access energized parts in the system. For example, an enclosure 390 of the SPTOS 150 can be designed to include a plurality of isolated, insulated and enclosed compartments (e.g., sub-enclosures, chambers, etc.) for selectively housing and isolating components of the system to enable or restrict access thereto. The compartments can be configured with an access (e.g., door, etc.) to enable the compartments to be opened under certain conditions, such as when the load-side components are de-energized (e.g., when the breaker assembly 320 is in the racked-out state, when the voltage sensor identifies the absence of voltage, etc.). In various embodiments, a lock mechanism(s) (e.g., a door lock mechanism, etc.) can be used to prevent access to the compartments. The lock mechanism can be controlled by the controller of the SPTOS 150 to lock and unlock access to a compartment(s) according to operating conditions in the system. For example, the compartments can be unlocked to enable access when the load-side components are de-energized, and locked when the load-side components are energized. Various sensors can be used to detect these operating conditions (e.g., voltage sensor to detect energized (or de-energized state of a component(s), a position detector to detect a position of a component (e.g., racked-in or racked-out state, etc.). The lock mechanism (or lock) can be an electrical lock, mechanical lock or a combination thereof.

In this example, the enclosure 390 can include at least two isolated, insulated and enclosed compartments 392 and 394 that can share a common wall. The first compartment 392 can house the line-side buses of the bus system 380, the draw-out circuit breaker assembly 320, the motor operator 340/operating mechanism, and the shutter assembly 330. The second compartment 394 can include the load-side connector assembly 360, such as for example, customer connectors/connections for each phase (e.g., Phase A, B, and C), and if desired, also Ground (G) and/or Neutral (N). The second compartment 394 also can include a barrier system 370 including an interphase barrier system to isolate the components of each phase from the other phases, and can provide tool safe barrier(s) between the two compartments. The barrier system 370 also can include barriers in the second compartment 394 to isolate the load-side components for each phase, Neutral (N) and Ground (GND) from each other. The barriers can be made of a dielectric material or other insulating material (e.g., plastic, etc.). The second compartment 392 also can include an access (e.g., a door, etc.) to enable a user to open and access the compartment, when the load-side components are de-energized. In various embodiments, the compartments of the enclosure 390 can be designed to be arc resistant (e.g., arc resistant to comply with ANSI/IEEE C37.20.7 arc-resistant test guide).

In various embodiments, the first compartment 392 can include a voltage sensor(s) to detect a presence (or absence) of voltage on the line-side components, and the second compartment 394 can include a voltage sensor(s) to detect a presence (or absence) of voltage on the load-side components. As described herein one or more voltage indicators can be provided to output the presence or absence of voltage on the load-side components, line-side components and/or other components. In various embodiments, the voltage indicator can be an "Absence of Voltage Indicator", which can conform to the requirements of National Fire Protection Association (NFPA) 70E®, Standard for Electrical Safety in the Workplace®, and may allow a user (e.g., maintenance personnel) to reduce Personal Protection Equipment (PPE) when no electrical shock hazards are present in an enclosure or enclosed compartment.

The above describes various protective (or safety) features, which may be incorporated into a SPTOS (e.g., 150). It should be understood that an SPTOS can include any combination of the protective features described herein.

Figure 5:
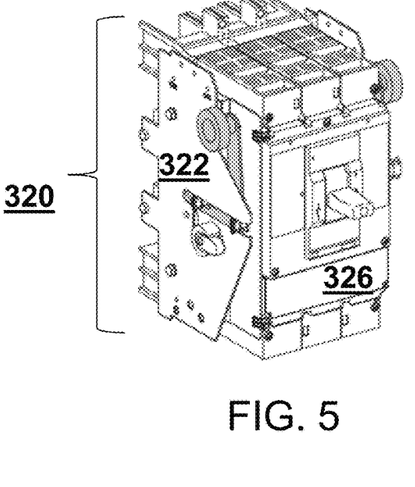
FIGS. 5, 6 and 7 show different views of example components of a breaker assembly, such as with a draw-out circuit breaker engaged with a breaker cradle in a racked-in state, the draw-out circuit breaker removed from the breaker cradle and the racking assembly in the racked-out state, and the draw-out circuit breaker in the breaker cradle in a racked-out state, respectively, in accordance with an embodiment described herein.
Figure 6:
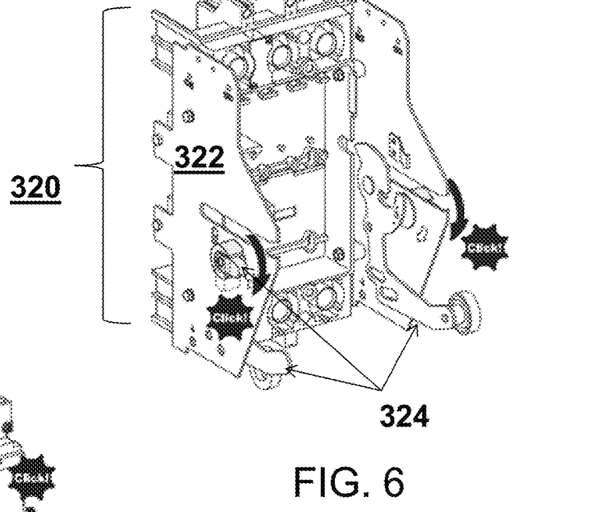
Figure 7:
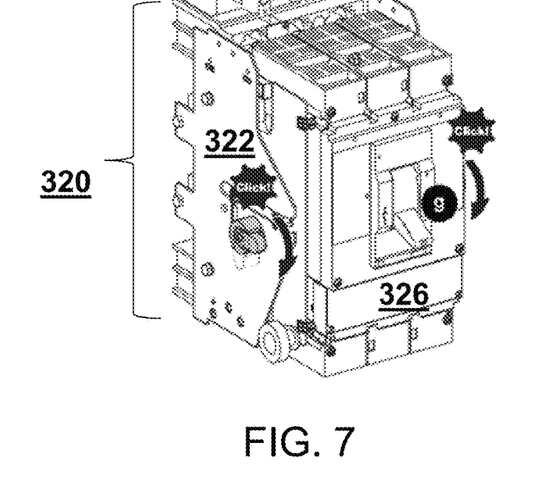

FIGS. 5, 6 and 7 show different views of example components of a draw-out circuit breaker assembly 320. For example, FIG. 5 shows the draw-out circuit breaker 326 racked-in the breaker cradle 322 of the breaker assembly 320. FIG. 6 shows the circuit breaker 326 removed from the breaker cradle 322 with the racking assembly 324 in the racked-out state. FIG. 7 shows the draw-out circuit breaker 326 racked-out from the breaker cradle 322 in the racked-out state.

As shown in the examples of FIGS. 5-7, the racking assembly 324 or its components can be operated to rack-in or rack-out the circuit breaker 326 from the breaker cradle 322. In this example, the racking assembly 324 can include two arms for holding opposite sides of the circuit breaker 326, and can be pivoted to a racked-in state or racked-out state, to rack-in or rack-out the circuit breaker 326 to or from the breaker cradle 322, respectively. Each arm can include one or more rollers which can move along a corresponding track/guide in the enclosure. For example, the arms (and its rollers) are moved upward to a raised/top position to rack-in the circuit breaker 326 to the breaker cradle 322 in the racked-in state. The arms (and its rollers) can be moved downward to a down/bottom position to rack-out the circuit breaker 326 from the breaker cradle 322 in the racked-out state.

As discussed herein, the racking operation can be remotely controlled by a motor operator, which is operatively connected to the arm(s) or other portion of the racking assembly 324, or manually controlled by an operating mechanism operatively connected to the arm(s) or other portion of the racking assembly 324. The circuit breaker assembly 320 and its components, as shown in FIGS. 5-7, are simply provided as a non-limiting example. In various embodiments, the breaker cradle or portions thereof can be formed as part of the enclosure for the SPTOS 150, or formed separately and incorporated into the enclosure. Furthermore, different types of draw-out circuit breaker assemblies may be employed according to application requirements.

Figure 8:
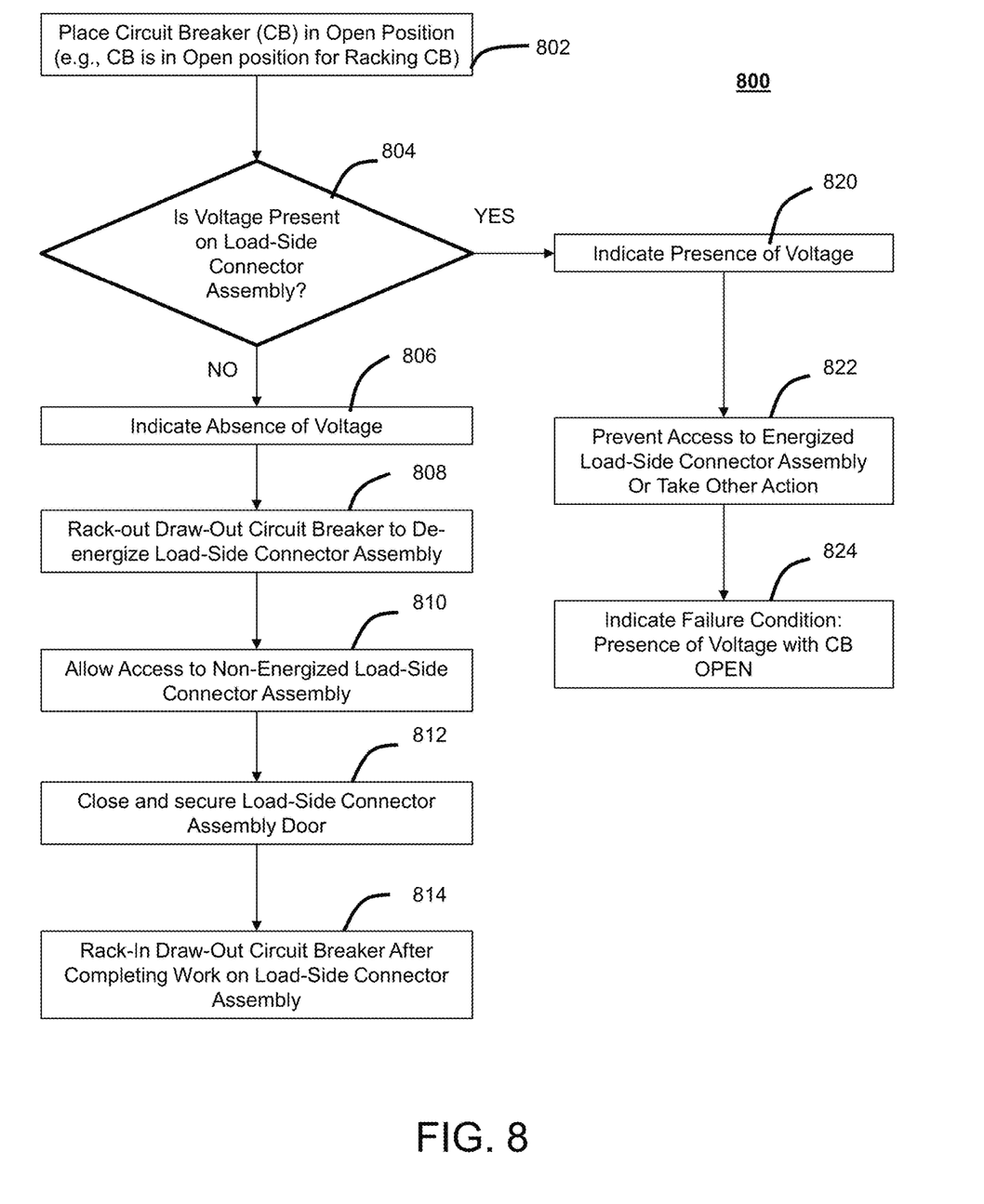
FIG. 8 is a flow diagram of various example operations performed by the scalable power tap off system and its components, in accordance with an embodiment described herein.

FIG. 8 is a flow diagram of an example method 800 of operating a scalable power tap off system SPTOS, in accordance with an embodiment. For the purposes of explanation, the method 800 will be described with reference to the SPTOS 150 and its components, and can be implemented under control of a controller(s) of the SPTOS.

The method 800 begins at block 802 in which the circuit breaker is placed in an open position (e.g., the circuit breaker is in an open position for racking).

At block 804, the controller of the SPTOS checks whether voltage is present on the load-side connector assembly (e.g., the cable connectors or lug connectors for connection to the downstream customer equipment) or other load-side component(s). For example, the controller can implement a voltage test or detection via a voltage sensor to check for the presence or absence of voltage on load-side components of the SPTOS, such as the load-side connector assembly. If a voltage is detected, the method 800 proceeds to block 820 in which the controller causes the voltage indicator to output a presence of voltage. At block 822, the controller can prevent access to the load-side connector assembly by keeping locked or locking the access (e.g., a door, etc.) to the enclosed compartment housing the load-side connector assembly. The controller also can take other action, such as reporting the presence of voltage to a remote device, such as a user device, via the communication interface. At block 824, a failure condition can be indicated or output to the user concerning the presence of voltage with the circuit breaker open.

Turning back to block 804, if a voltage is not detected, the method 800 proceeds to block 806 in which the controller causes the voltage indicator to indicate an absence of voltage on the load-side connector assembly or load-side component(s). At block 808, the draw-out circuit breaker assembly of the SPTOS is controlled to rack-out the draw-out circuit breaker from the breaker cradle. The breaker assembly can be controlled via remote control by the controller according to a command signal received from a remote user device (e.g., smartphone, computer tablet, laptop or other computer device), to rack out the circuit breaker or controlled manually via an operating mechanism from a safe distance. The command signal can be received by a communication interface of the SPTOS via wireline or wireless communication.

At block 810, the controller allows access to the load-side connector assembly by unlocking access (e.g., a door, etc.) to the enclosed compartment housing the load-side connector assembly. The controller also can take other action, such as reporting the absence of voltage to a remote device, such as a user device, via the communication interface.

After access is available to the load-side connector assembly, a user can safely work on the de-energized components of the load-side connector assembly (e.g., load-side connectors/connections, etc.), such as for example to add, replace or change a load or other downstream components. For example, this can include connecting or disconnecting or replacing downstream cables which supply power to downstream components (e.g., track busway or load(s) connected thereto) to or from the load-side connector assembly (or connectors thereof) of the SPTOS.

When the work is completed on the de-energized load-side components of the SPTOS, the access to the enclosed compartment can be closed at block 812. For example, the load-side connector assembly door can be closed and secured. Thereafter, at block 814, the circuit breaker can be racked-in to the breaker cradle, via remote or manual control. Once the circuit breaker is racked-in to the breaker cradle, the circuit breaker can be turned ON to allow power from an upstream power bus to flow downstream from the SPTOS, such as for example power to flow to downstream customer equipment connected to the SPTOS. The circuit breaker also may be controlled using remote control to turn ON, OFF, RESET, etc. under control of the controller, which can control an operation of an arm or other switch actuator to move the switch of the circuit breaker to the ON, OFF, RESET or other state. Alternatively, the circuit breaker or its switch can be operated manually.

Furthermore, in various embodiments, the SPTOS may be installed on a busway or other power bus system, without the draw-out circuit breaker. The shutter assembly and other protective features as described herein enable a user to safely access the enclosed compartment with the breaker assembly (e.g., via an access door) which can be unlocked and/or opened when the breaker assembly is in the racked-out state. In this way, the draw-out circuit breaker can be installed into the SPTOS at a later date, even while the upstream power bus (e.g., busway 110 in FIG. 1) remains energized. For example, the circuit breaker can be installed when customer equipment is to be connected to the SPTOS (e.g., adding new equipment such as new track busway and data racks to a data center, etc.). Furthermore, the protective features also enable a racked-out circuit breaker of a SPTOS to be swapped out for another draw-out circuit breaker in a safe manner, even while the upstream power bus (e.g., busway 110 in FIG. 1) remains energized.

Figure 9:
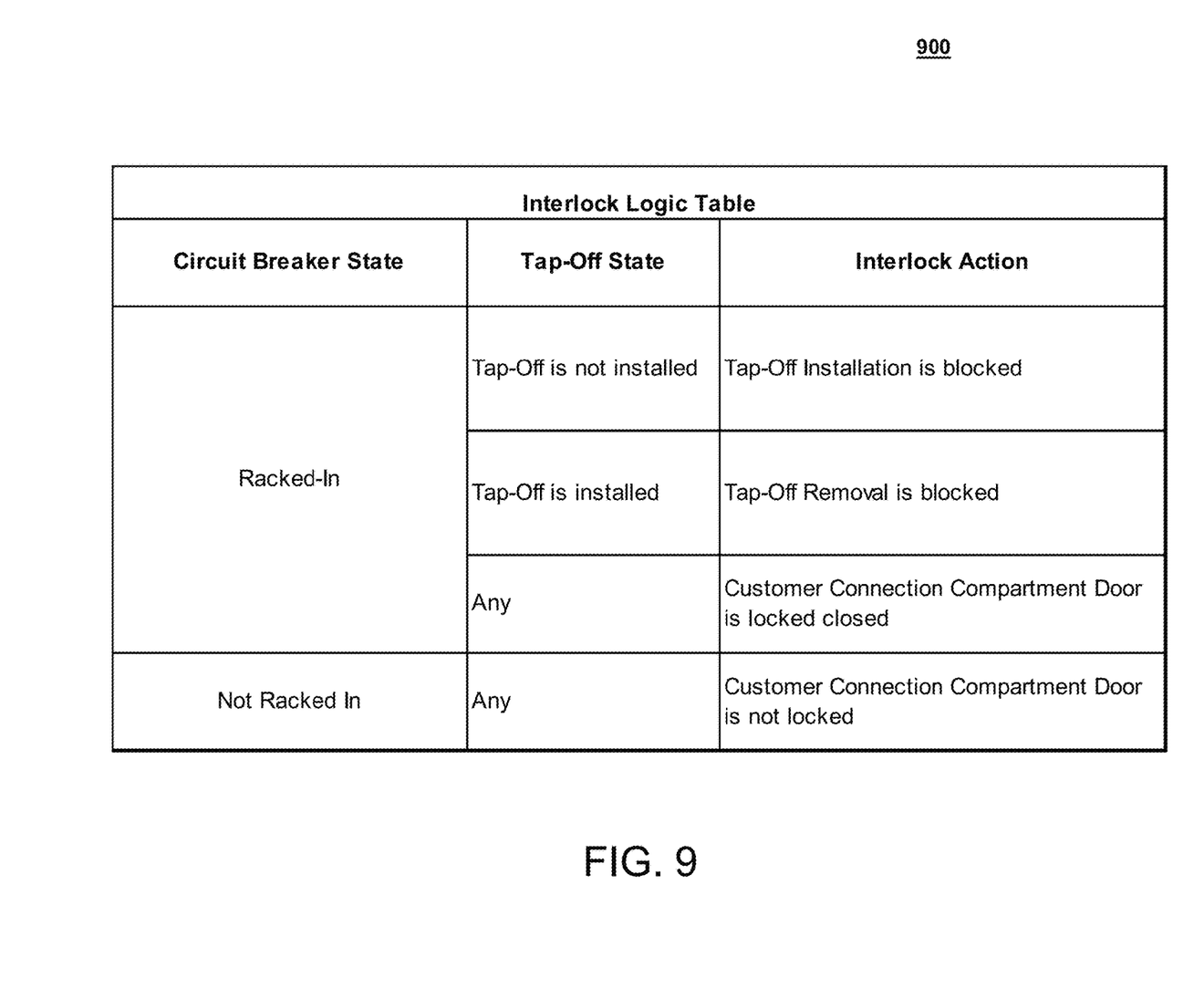
FIG. 9 is a Table of example interlock logic, in accordance with an embodiment described herein.

FIG. 9 is a Table 900 of example interlock logic. As shown, Table 900 describes various example and associated circuit breaker state(s), tap off state(s) and interlock action(s), in accordance with various embodiments.

The above describes various non-limiting examples of a SPTOS and its components. It should be understood that various aspects of the SPTOS and its components may be modified. For example, the types of line-side connector assembly and load-side connector assembly may employ different types of connectors, such as plug-in connectors, bolt-on connectors, cable connectors, lug connectors, and so forth. The enclosure of the SPTOS can include any number of enclosed compartments for housing different combinations of components of the SPTOS. In the SPTOS, the enclosure or its walls, shutter, interphase and other barriers and other parts which protect against potential energized equipment in the SPTOS may be formed of an insulating material (e.g., plastic, dielectric material, or other insulating material).

Furthermore, although the above examples describe the SPTOS for use with a busway, the SPTOS can be employed in a variety of power distribution environments. For example, the SPTOS system can be applicable to busway as well as switchgear, switchboard, panelboards, and motor control centers (MMC) and other electrical distribution equipment. The SPTOS system or its load-side an line-side connector assemblies can be configured to connect to a busway, insulated bus or other types of power bus(es) or conductor(s).

In the preceding, reference is made to various embodiments. However, the scope of the present disclosure is not limited to the specific described embodiments. Instead, any combination of the described features and elements, whether related to different embodiments or not, is contemplated to implement and practice contemplated embodiments. Furthermore, although embodiments may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

It will be appreciated that the development of an actual commercial application incorporating aspects of the disclosed embodiments will require many implementation specific decisions to achieve a commercial embodiment. Such implementation specific decisions may include, and likely are not limited to, compliance with system related, business related, government related and other constraints, which may vary by specific implementation, location and from time to time. While a developer's efforts might be considered complex and time consuming, such efforts would nevertheless be a routine undertaking for those of skill in this art having the benefit of this disclosure.

It should also be understood that the embodiments disclosed and taught herein are susceptible to numerous and various modifications and alternative forms. Thus, the use of a singular term, such as, but not limited to, "a" and the like, is not intended as limiting of the number of items. Similarly, any relational terms, such as, but not limited to, "front", "back", "top," "bottom," "left," "right," "upper," "lower," "down," "up," "side," and the like, used in the written description are for clarity in specific reference to the drawings and are not intended to limit the scope of the invention.

This disclosure is not limited in its application to the details of construction and the arrangement of components set forth in the following descriptions or illustrated by the drawings. The disclosure is capable of other embodiments and of being practiced or of being carried out in various ways. Also, the phraseology and terminology used herein is for the purpose of descriptions and should not be regarded as limiting. The use of "including," "comprising," "having," "containing," "involving," and variations herein, are meant to be open-ended, i.e., "including but not limited to."

The various embodiments disclosed herein may be implemented as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer-readable medium(s) having computer-readable program code embodied thereon.

Any combination of one or more computer-readable medium(s) may be utilized. The computer-readable medium may be a non-transitory computer-readable medium. A non-transitory computer-readable medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer-readable medium can include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages. Moreover, such computer program code can execute using a single computer system or by multiple computer systems communicating with one another (e.g., using a local area network (LAN), wide area network (WAN), the Internet, etc.). While various features in the preceding are described with reference to flowchart illustrations and/or block diagrams, a person of ordinary skill in the art will understand that each block of the flowchart illustrations and/or block diagrams, as well as combinations of blocks in the flowchart illustrations and/or block diagrams, can be implemented by computer logic (e.g., computer program instructions, hardware logic, a combination of the two, etc.). Generally, computer program instructions may be provided to a processor(s) of a general-purpose computer, special-purpose computer, or other programmable data processing apparatus. Moreover, the execution of such computer program instructions using the processor(s) produces a machine that can carry out a function(s) or act(s) specified in the flowchart and/or block diagram block or blocks.

The flowchart and block diagrams in the Figures illustrate the architecture, functionality and/or operation of possible implementations of various embodiments of the present disclosure. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is to be understood that the above description is intended to be illustrative, and not restrictive. Many other implementation examples are apparent upon reading and understanding the above description. Although the disclosure describes specific examples, it is recognized that the systems and methods of the disclosure are not limited to the examples described herein, but may be practiced with modifications within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

We claim:

1. A power tap off system (PTOS) for a power distribution system, the PTOS comprising a plurality of PTOS components including:
    a line-side connector assembly configured to connect to an upstream power supply;
    a load-side connector assembly configured to connect to one or more downstream loads;
    a draw-out circuit breaker assembly connected between the line-side connector assembly and the load-side connector assembly, the draw-out breaker assembly including:
        a breaker cradle configured to receive a draw-out circuit breaker, and
        a racking assembly configured to rack in or rack out the draw-out circuit breaker from the breaker cradle, the load-side connector assembly being disconnected from the line-side connector assembly when the draw-out circuit breaker is racked out from the breaker cradle;
    a shutter assembly including a movable shutter configured to provide a barrier to prevent access to at least line-side electrical components of the PTOS components on the breaker cradle when the draw-out circuit breaker is racked out from the breaker cradle;
    one or more insulated interconnect buses, the one or more insulated interconnect buses comprising:
        one or more line-side interconnected buses configured to electrically connect the line-side connector assembly to the breaker cradle, and
        one or more load-side interconnected buses configured to electrically connect the load-side connector assembly to the breaker cradle; and
    an enclosure including a plurality of enclosed compartments configured to house the PTOS components, a first enclosed compartment of the enclosed compartments housing the load-side connector assembly and isolating the load-side connector assembly from the line-side connector assembly, the draw-out circuit breaker assembly and the one or more line-side interconnected buses, and the first enclosed compartment configured to allow access to the load-side connector assembly when the draw-out circuit breaker assembly is in a racked-out state and prevent access to the load-side connector assembly when the draw-out breaker assembly is in a racked-in state.

2. The power tap off system according to claim 1, wherein the draw-out breaker assembly further comprises the draw-out circuit breaker.

3. The power tap off system according to claim 1, wherein the line-side connector assembly includes connectors which are configured to connect to a power busway of the power distribution system.

4. The power tap off system according to claim 1, wherein the line-side connector assembly comprises a plurality of plug-in line connectors or bolt-on line connectors.

5. The power tap off system according to claim 1, wherein the shutter assembly is operatively connected to the racking assembly and is configured to move to an open state when the draw-out circuit breaker is racked-out or withdrawn, the shutter of the shutter assembly being positioned in the open state to create a barrier around line-side terminals or the at least line-side electrical components on the breaker cradle in order to prevent user access thereto.

6. The power tap off system according to claim 5, wherein the shutter assembly further includes: a shutter arm which is connected to move the shutter between the open state and a closed state, and a shutter linkage which is connected between the shutter arm and the racking assembly, the shutter linkage causing the shutter arm to move the shutter to the open state when the racking assembly is operated to the racked-out state and causing the shutter arm to move the shutter to an open state when the racking assembly is operated to the racked-in state.

7. The power tap off system according to claim 1, wherein the line-side connector assembly and the load-side connector assembly each include a connector for each phase of a multi-phase power supply of the power distribution system.

8. The power tap off system according to claim 7, further comprising interphase barriers in the enclosure between each phase of the multi-phase power supply.

9. The power tap off system according to claim 7, wherein the line connector assembly and the load connector assembly each further include a connector for neutral and/or a connector for ground.

10. The power tap off system according to claim 1, wherein the first enclosed compartment includes a first door through which to access the load-side connector assembly.

11. The power tap off system according to claim 10, wherein the first door includes a lock mechanism which is configured to lock the door when:
    a voltage is detected by a voltage sensor on the load-side connector assembly or on the one or more load insulated interconnect buses, or
    when the draw-out breaker assembly is in the racked-in state.

12. The power tap off system according to claim 1, further comprising:
    a voltage sensor configured to detect a voltage on the load-side connector assembly or the one or more load insulated interconnect buses; and
    a voltage indicator configured to indicate a presence or absence of the voltage on the load-side connector assembly or the one or more load insulated interconnect buses, according to the detection.

13. The power tap off system according to claim 1, wherein another of the enclosed compartments houses the draw-out circuit breaker assembly, the shutter assembly and the one or more line-side insulated interconnect buses, and the another of the enclosed compartments includes a second door through which to access the draw-out breaker assembly for installing the draw-out circuit breaker or removing the draw-out circuit breaker when the draw-out circuit breaker assembly is in the racked-out state.

14. The power tap off system according to claim 13, wherein the second door includes a lock mechanism which is configured to lock the second door when the draw-out circuit breaker is racked-in to the breaker cradle or voltage is detected by a voltage sensor on the load-side connector assembly.

15. The power tap off system according to claim 1, further comprising: a motor operator configured to control racking operation of the racking assembly and/or the shutter assembly.

16. The power tap off system according to claim 1, wherein the first enclosed compartment is designed to be arc resistant.

17. The power tap off system according to claim 1, wherein another of the enclosed compartments are configured to house the at least line side electrical components, the another of the enclosed compartments designed to be arc resistant.

18. The power tap off system of claim 1, wherein the first enclosed compartment of the enclosed compartments further allows access to the load-side connector assembly when the load-side connector assembly is de-energized.

19. A power distribution system, comprising:
one or more power distribution components; and
a power tap off system (PTOS) coupled to the one or more power distribution components, the PTOS comprising:
   a line-side connector assembly configured to connect to an upstream power supply;
   a load-side connector assembly configured to connect to one or more downstream loads;
   a draw-out circuit breaker assembly connected between the line-side connector assembly and the load-side connector assembly, the draw-out breaker assembly including:
      a breaker cradle configured to receive a draw-out circuit breaker, and
      a racking assembly configured to rack in or rack out the draw-out circuit breaker from the breaker cradle, the load-side connector assembly being disconnected from the line-side connector assembly when the draw-out circuit breaker is racked out from the breaker cradle;
      a shutter assembly including a movable shutter configured to provide a barrier to prevent access to at least line-side electrical components of the PTOS components on the breaker cradle when the draw-out circuit breaker is racked out from the breaker cradle;
   one or more insulated interconnect buses, the one or more insulated interconnect buses comprising:
      one or more line-side interconnected buses configured to electrically connect the line-side connector assembly to the breaker cradle, and
      one or more load-side interconnected buses configured to electrically connect the load-side connector assembly to the breaker cradle; and
   an enclosure including a plurality of enclosed compartments configured to house the PTOS components, a first enclosed compartment of the enclosed compartments housing the load-side connector assembly and isolating the load-side connector assembly from the line-side connector assembly, the draw-out circuit breaker assembly and the one or more line-side interconnected buses, and the first enclosed compartment configured to allow access to the load-side connector assembly when the draw-out breaker assembly is in a racked-out state and prevent access to the load-side connector assembly when the draw-out breaker assembly is in a racked-in state.

20. A method of using the PTOS of claim 1, the method comprising:
   determining that the draw-out circuit breaker in an open position of the breaker cradle;
   responsive to determining that a voltage is not present on the load-side connector assembly, providing an indication specifying an absence of the voltage;
   performing a first racking operation to rack out the draw-out circuit breaker from the breaker cradle to de-energize the load-side connector assembly, wherein the shutter assembly including the movable shutter is configured to provide the barrier to prevent access to the at least line-side electrical components on the breaker cradle when the draw-out circuit breaker is racked out from the breaker cradle;
   allowing access to the de-energized load-side connector assembly; and
   performing a second racking operation to rack in the draw-out circuit breaker.

* * * * *